United States Patent [19]

Feres

[11] 4,153,500
[45] May 8, 1979

[54] THIN FILM COATING EVAPORATOR

[76] Inventor: Väclav Feres, Haid-und Neu-Strasse 14, D-7500 Karlsruhe 1, Fed. Rep. of Germany

[21] Appl. No.: 553,213

[22] Filed: Feb. 26, 1975

[30] Foreign Application Priority Data

Feb. 28, 1974 [DE] Fed. Rep. of Germany ....... 2409502

[51] Int. Cl.² ............................................. B01D 1/22
[52] U.S. Cl. ................................... 159/6 R; 159/11 A
[58] Field of Search .......................... 159/6 R; 233/11; 165/86–88; 202/236

[56] References Cited

U.S. PATENT DOCUMENTS

| 2,210,927 | 8/1940 | Hickman | 159/6 R |
| 3,092,180 | 6/1963 | Dahlgren | 165/88 |
| 3,221,807 | 12/1965 | Johansson | 165/88 |
| 3,430,690 | 3/1969 | Sciaux | 159/6 R X |
| 3,477,094 | 11/1969 | Maahs et al. | 159/2 E |

FOREIGN PATENT DOCUMENTS

| 1034585 | 7/1958 | Fed. Rep. of Germany | 159/6 R |
| 1114783 | 8/1959 | Fed. Rep. of Germany | 159/6 R |
| 1090637 | 10/1960 | Fed. Rep. of Germany | 159/6 R |
| 1583466 | 10/1969 | France | 159/6 R |
| 4571 of | 1910 | United Kingdom. | |

Primary Examiner—Norman Yudkoff
Attorney, Agent, or Firm—Craig & Antonelli

[57] ABSTRACT

A thin film evaporator comprising an element having a conical, interior surface thereon which surface defines an evaporator surface and an outer casing within which the element is disposed is further provided with a support casing intermediate the said element and outer casing, the said support casing being permeable to the heat exchange medium and being connected, with the element providing the evaporator surface, at at least one location intermediate the axial limits thereof.

25 Claims, 8 Drawing Figures

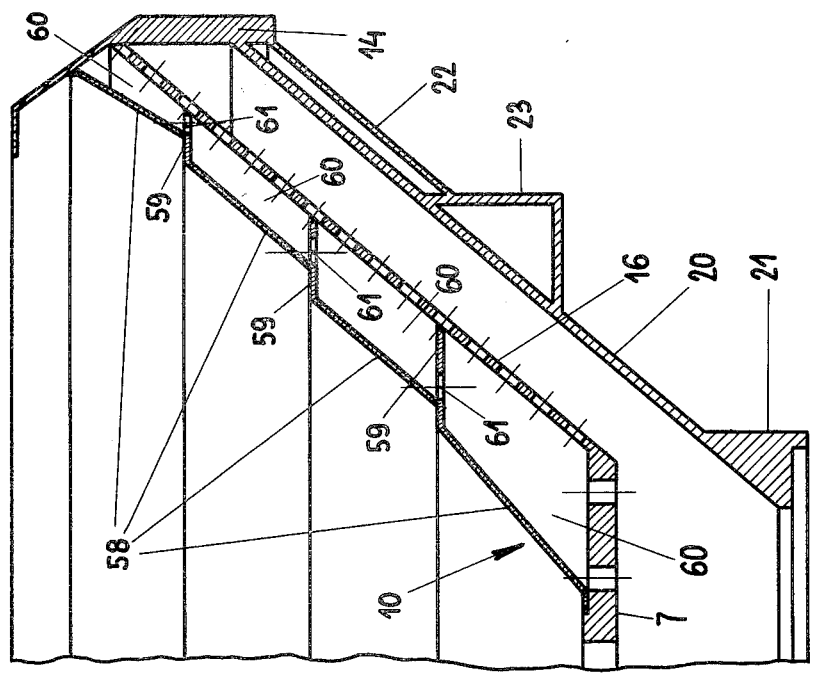
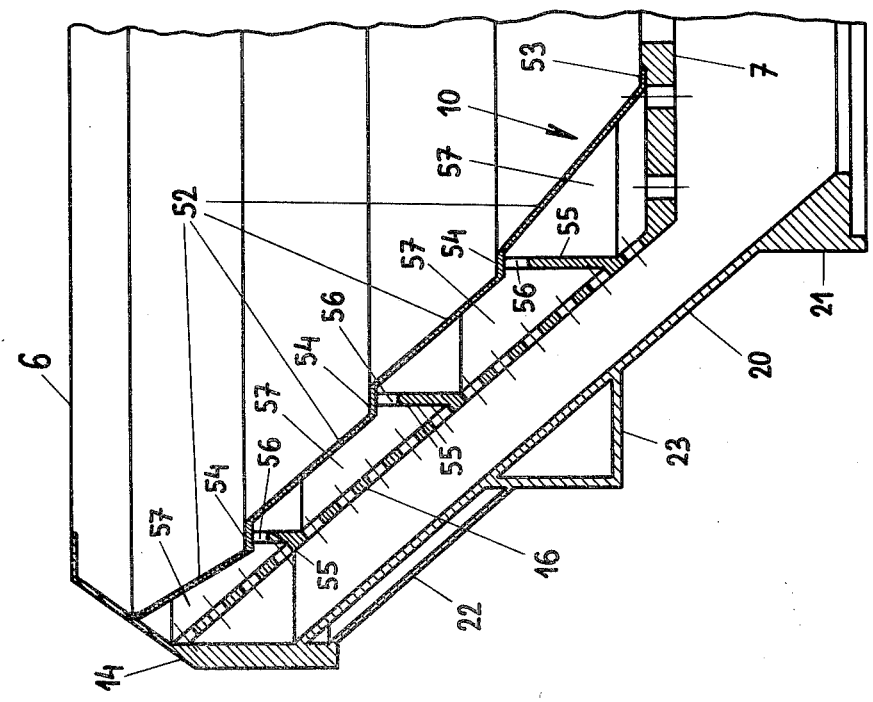

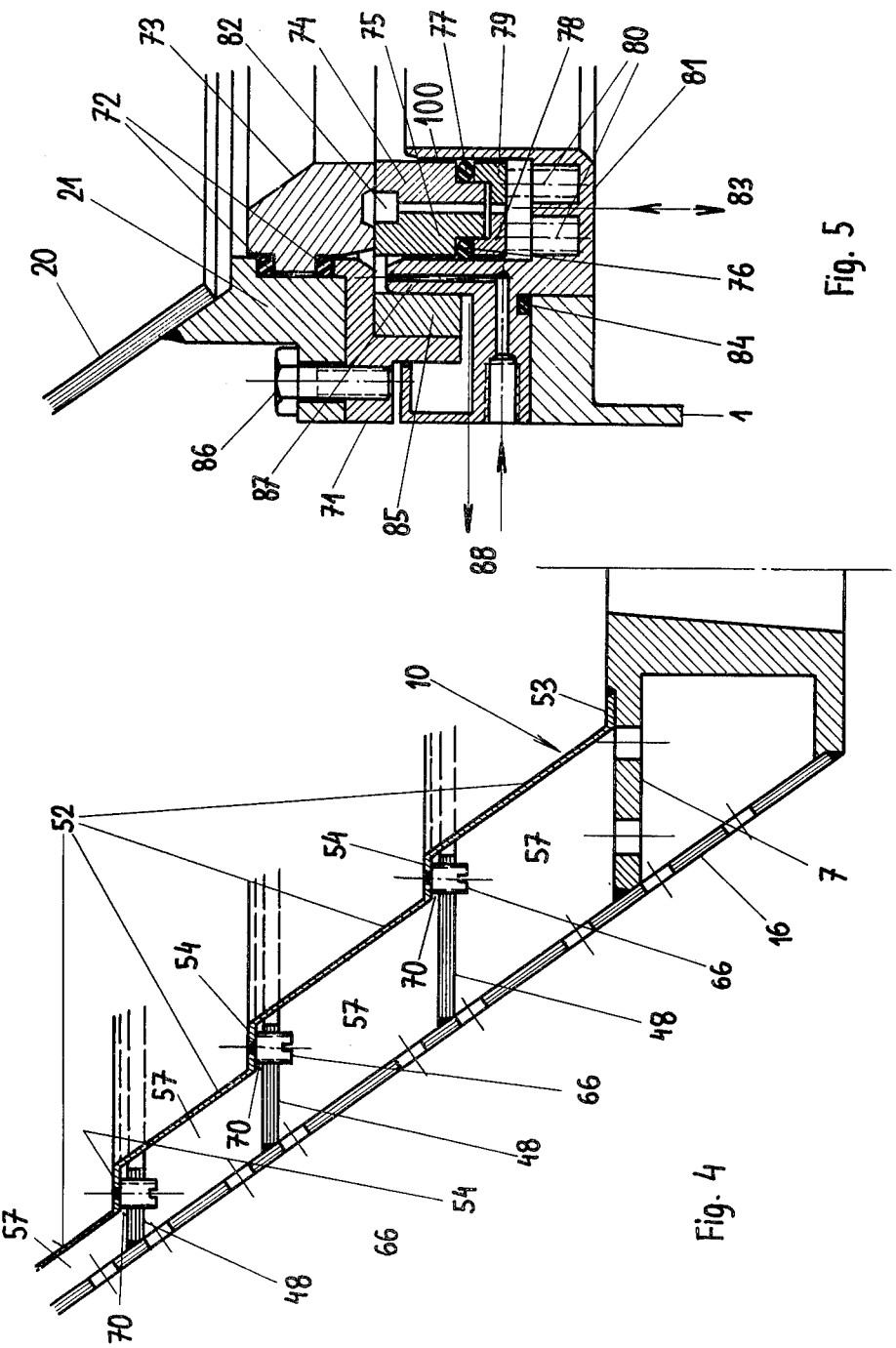

THIN FILM COATING EVAPORATOR

The invention relates to a thin film evaporator having a conical evaporation surface rotating at high peripheral speed in a vapour chamber, which evaporation surface is surrounded by an outer casing rotating therewith and forming a heat-exchange medium chamber.

A number of thin film evaporators of this general type are known, as is evidenced, for example, by German Patent Specification Nos. 1,114,783, 1,090,637, 1,064,968; U.S. Pat. No. 2,734,023; and Swiss Patent Specification No. 206,743. The evaporators are used in particular in the foodstuffs and medicine industry for the distillation and concentration of thermally unstable and easily oxidizable substances. Whilst with thin film evaporators having rotating distribution blades the film is produced as the liquid runs off of static, substantially perpendicular evaporation surfaces, in the aforementioned thin film evaporators, the film formation takes place by subjecting the liquid to be evaporated to a high centrifugal acceleration whereby due to such acceleration forces the liquid spreads out from smaller to larger diameters of a conical evaporation surface. In this way considerably smaller thicknesses of film can be achieved. Such thin film evaporators are also easily regulated, that is, the time of duration of the product on the evaporation surface is adjusted by simple variation of the speed of the apparatus. Furthermore, such thin film evaporators are operated, in order to reduce the temperature load of the product, frequently under vacuum.

The disadvantages with these thin film evaporators are the high manufacturing costs compared with static evaporation surfaces. One is therefore forced to optimize the thin film evaporators in respect of their economic operation. This can be achieved by a high specific heat load, for example, by extreme reduction of the thickness of the wall of the evaporation surfaces. Because of the extraordinarily high stresses which, due to great differences of pressure between the vapour chamber and the heat exchange medium chamber, act on the evaporating surface, the thickness of the wall is of course subject to lower limits, especially as the element presenting the evaporation surface is, in the conventional centrifugal thin film evaporators, fixed only on its inner and outer periphery in the rotor. This fact gives rise to the aforementioned thin layer evaporators being only on the market today in the form of relatively small dimensioned devices for use in connection in systems wherein only small differences of pressure between the heat exchange medium chamber and the evaporation chamber exist.

The invention is based on the problem of designing a thin film evaporator of the above-mentioned construction in which in spite of high specific heat loading, small wall thicknesses for the element providing the evaporation surface are acceptable, larger dimension apparatus is practical and/or greater pressure differentials can be accommodated.

This problem is solved, according to the invention, in that between the evaporation surface and the outer casing there is arranged a rotationally symmetrical supporting casing permeable to the heat exchange medium, such supporting casing connected with the element providing the evaporation surface at at least one place lying between its inner and outer periphery and being located with a flange directly or indirectly on the driven shaft of the rotary drive.

By means of this supporting casing the evaporation surface with optimally low wall thickness receives a sufficient reinforcing thus permitting of the manufacture of the evaporator with high stresses also in larger dimensions and for greater differences of pressure. The supporting casing thereby reinforces not only the evaporation surface but the whole rotor formed from the evaporation surface and the outer casing. A further reinforcing may be achieved by profiling the evaporation surface and/or by a conical contruction of evaporation surface and supporting casing with distance pieces inserted therebetween. As the element providing the evaporation surface, due to the design of the supporting construction according to the invention, can be made very thin-walled, it is very sensitive to non-rotationally symmetrical mechanical stresses. These may, for example, occur due to wobbling of the rotor. The invention therefore provides, furthermore, for a special bearing of the rotor.

The invention will now be described further, by way of example only, with reference to the accompanying drawings illustrating several embodiments thereof and in which:

FIGS. 2A and 2B are sections, drawn to a larger scale, through a rotor similar to FIG. 1 but showing two further preferred embodiments of the present invention.

FIG. 4 is a section corresponding to a part of FIG. 1 and shows a modified form of rotor construction;

FIG. 5 shows an axial section, drawn to an enlarged scale, of one form of rotor bearing.

Figure 1:
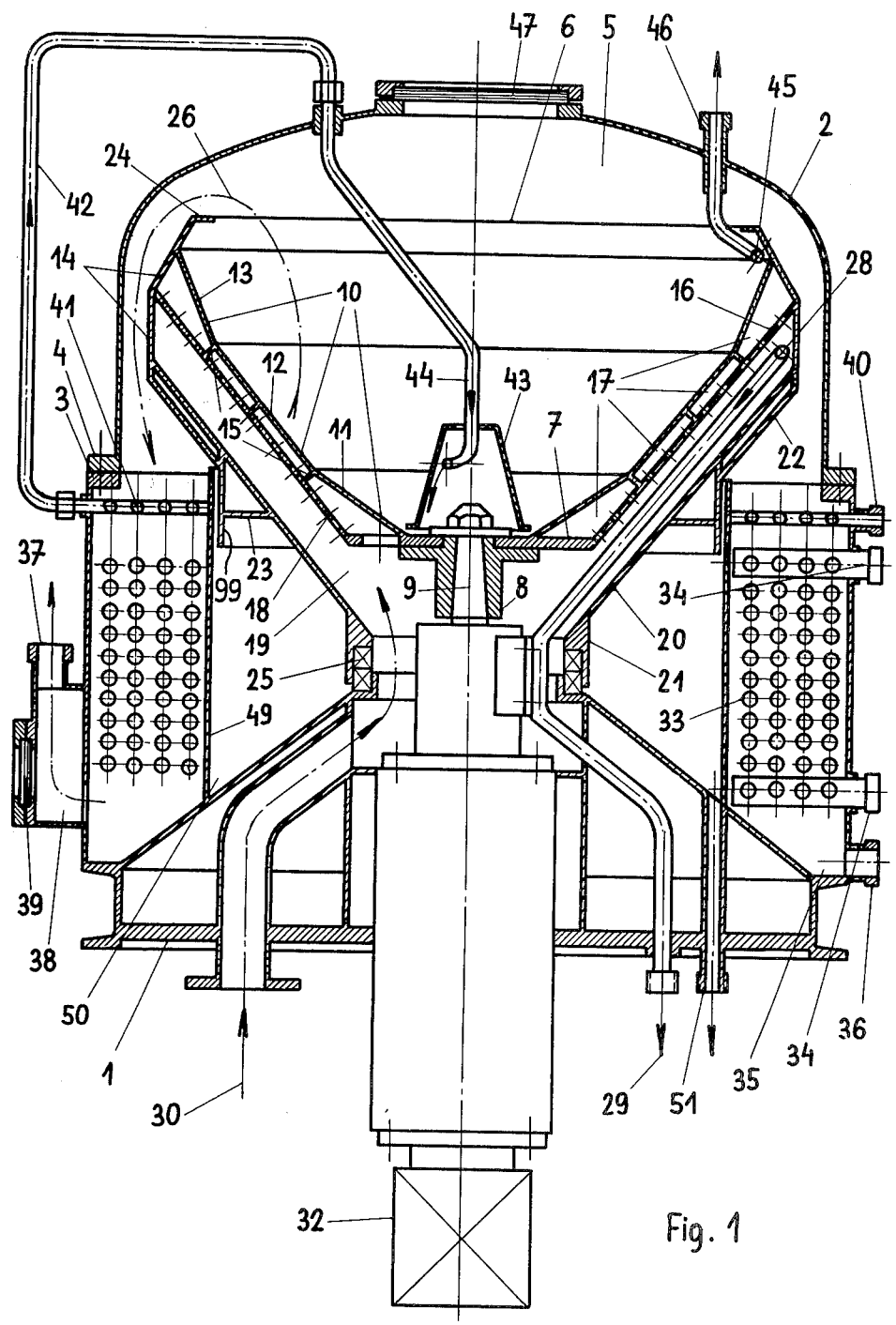
FIG. 1 shows a section through a thin layer evaporator having a rotor constructed in accordance with the invention.

Referring now to the drawings, the thin layer evaporator is enclosed within a housing comprising stationary lower and upper parts 1,2 having respective flanges 3,4 whereby the same are secured together. The upper part 2 surrounds a vapour chamber 5 in which a rotor, designated in its entirety by the reference 6, rotates at high peripheral speed. The rotor 6 is secured to the output shaft 9 of a rotary drive 32 by means of a flanged collar 8.

The rotor 6 consists of a thin-walled heat-transfer element having an evaporation surface 10 and an outer casing 20 arranged in spaced apart disposition and outwardly thereof. The intermediate space 19 between the evaporation element and the outer casing defines a heating chamber into which a heat exchange medium is introduced, in the direction of the arrow 30.

Between the evaporation surface 10 and the outer casing 20 there is disposed a supporting casing 16 which is permeable to the heat exchange medium, such supporting casing comprising, for example, a sheet metal plate having a multiplicity of perforations 18 therein. The supporting casing 16 has a flange 7 whereby such casing is mounted on the flanged collar 8 secured to the output shaft 9.

In the embodiment shown in FIG. 1 the evaporation surface 10 is defined by successive frusto-conical sections of respective, and increasing, conicities, being formed, for example, by three successive sections 11,12,13 of increasing pitch. The outer casing 20 is bent inwards, at its outer periphery, to form a ring 14 to the inner side of which, and spaced slightly from the periphery, is welded the outer section 13 of the evaporation surface 10. Outwardly of section 13, the lip of the casing 20 is formed with an inwardly drawn edge 24.

The evaporation surface 10 is connected to the supporting casing 16 by means of spacers 15. In the embodiment shown the spacers 15 are each formed as an annular ring coaxial with the surface 10 so that two adjacent circular rings, together with the corresponding part of the evaporation surface 10 and the supporting casing 16, form a closed honeycomb condensation chamber into which the heat exchange medium can pass through the bores 18 of the supporting casing 16. Furthermore, the individual honeycomb spaces 17 are connected to one another by means of apertures in the spacers. Any condensate forming on that face of the evaporation element remote from the evaporation surface 10 during operation is thrown off due to centrifugal forces and reaches, through the heat exchange medium chamber, the inner surface of the outer casing 20, with the condensate, due to its rotational energy, moving upwardly of the casing. A scoop tube 28 is provided in the upper region of the heat exchange medium chamber 19, such tube 28 serving to collect the condensate to convey the same from the apparatus in the direction of the arrow 29.

A depending flange 21 of the rotor 6 carried by the output shaft 9 seals the outer casing 20 in relation to the lower housing part 1 by means of a slide ring seal 25.

One suitable bearing arrangement is shown in FIG. 5, the arrangement illustrated preventing wobbling of the outer casing 20, even at high speeds. On the depending flange 21 of the outer casing 20 there is fixed, by means of screws 86, a sliding bearing 71 having a bearing bush 85. The sliding bearing 71 and the flange 21 resiliently support, via two seals 72, a counter ring 73 of the sliding ring seal. Two stationary slide rings 74,75 are provided in an annular recess 100 of a bearing head 81 in sealed relationship with the rotating counter ring 73, being resiliently urged into contact therewith by means of compression springs 80 operating through pressure rings 78,79 and seals 76,77, the slide rings thus being axially movable relative to bearing head 81 mounted on the lower part 1 of the casing of the apparatus. An annular chamber 82 is formed by and between two stationary slide rings 74,75 which in the direction of the double arrow 83 is flushed with sealing fluid. The bearing bushing 85 bears on a stationary bearing ring 87, such ring 87 being part of the bearing head 81, and is lubricated in respect of the bearing ring. The direction of lubricant flow is indicated by the arrow 88. A seal 84 is interposed between the bearing head 81 and the lower part 1 of the casing of the apparatus. The bearing bushing 85 and the counter ring 73 are of carbon and the lubricant used is water. The outer casing 20 has several annular reinforcements 22,23 at its outer surface, the reinforcements also serving to form insulation chambers. The lower reinforcement 23 has a depending skirt 99 to the inside of which compensating weights can readily be applied for the balancing of the rotor.

A pre-heater is provided within the lower part 1 of the casing of the apparatus, such pre-heater comprising, for example, a coiled-tube heat-exchanger 41 for the starting product, such heat-exchanger entering at 40. The pre-heated starting product is fed to the evaporator via pipe 42 and pipe 44, the latter entering the evaporator from above through the vapour chamber 2. Liquid from pipe 44 is introduced into the evaporator in the area of the shaft 9, the pipe 44 terminating beneath a guard 43 and the liquid spreading over the evaporation surface 10 from beneath such guard. Vapours to be evacuated are drawn out from vapour chamber 5 into the lower part 1 of the casing of the apparatus in the direction of arrow 26 and pass through a cooler 33 fed with cooling medium via the connection pieces 34. The condensate falls as pure distillate into the receiving chamber 35 and can be drawn therefrom via a connection piece 36. A separating chamber 38 is provided laterally on the receiving chamber 35, the separating chamber being connectable with a source of vacuum via a connection piece 37. The separating chamber 38 is provided with an inspection glass 39. The cooler 33 is protected from the outer casing 20 of the rotor by a radiation screen 49. Between the outer casing and the screen 49 there is a space 50 in which any liquid emerging from the slide ring seal 25 is collected, and drained through a connection piece 51.

The thin layer occurring due to the centrifugal feed of the rotating evaporation surface 10 spreads as a closed film from the smallest diameter of the evaporation surface outwards to the largest diameter and is collected in the channel formed by the drawn-in edge 24. A scoop pipe 45 extends into the channel from above and serves to draw off the evaporated product through connection piece 46. Furthermore, in the upper part 2 of the housing there is provided a concentric inspection glass 47 through which the evaporation chamber can be inspected at any time in order to be able to ascertain in good time any disturbances in the process, for example, burnings or the like.

In the embodiment shown in FIG. 2, the supporting casing 16 and the outer casing 20 are formed mainly in the same manner as already described with regard to FIG. 1. The evaporation surface 10 is again defined by the surface of a thin sheet-metal plate bent to shape, the plate, in this instance, being bent in step-like manner.

In the embodiment shown at FIG. 2A, the evaporation surface 10 consists of four frusto-conical concentric faces 52 which are fixed on the flange 7 at their lower centering edge 53. Between the successive conical faces there is provided a step 54, each step being fixed to a respective spacer ring 55 which, in its turn, is part of or is fixed on the supporting casing 16. Between the individual spacer rings 55 and the respective associated sections of the evaporation surface 10 and of the supporting casing 16 there are formed again individual heat exchange medium spaces 57 connected together through openings 56. Each heat exchange medium space 57 is thus a self-supporting structure. The evaporation surface 10 as defined by the individual concentric frusto-conical faces 52 may be produced either in one piece or by shaping without cutting, or may be from individual sections 52.

In the embodiment shown in the FIG. 2B, the evaporation surface 10 consists of individual conical sections 58 which have an upper, approximately horizontal extending flange 59. The flanges 59 form a seating for the next succeeding section and, at their extremities, are welded to the supporting casing 16 and therefore serve, at the same time, to strengthen the total structure. Recesses 61 are formed in flanges 59 which connect together the heat exchange medium spaces 60 formed by the individual sections 58.

Figure 3B:
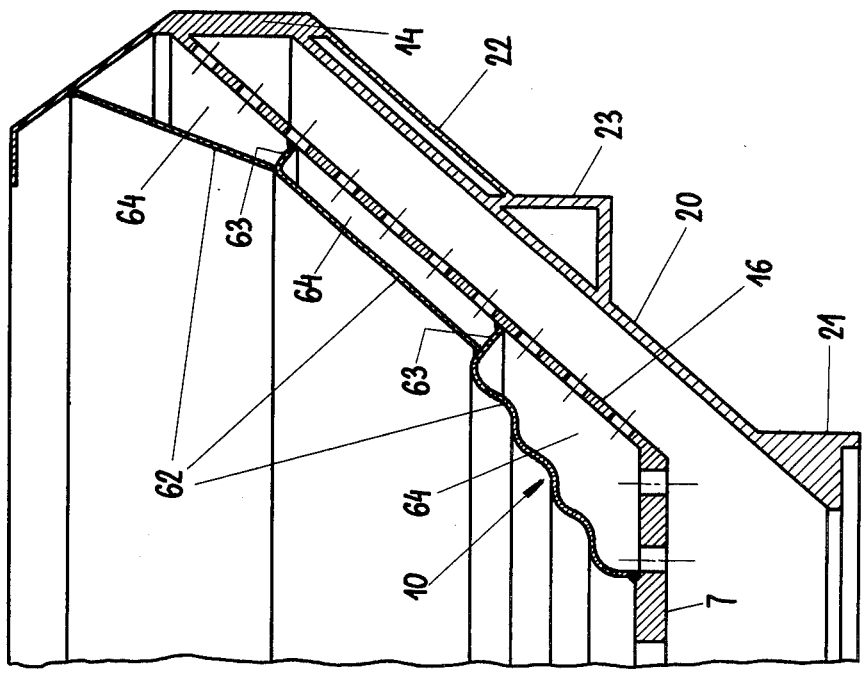
FIGS. 3A and 3B are views similar to FIGS. 2A and 2B, respectfully but showing two further embodiments of the invention.

In the embodiment shown at FIG. 3B, the supporting casing 16 and the outer casing 20 are formed in like manner to those of the previously described embodiments. The conical evaporation surface 10 consists in all, of three different sections 62 of which the lowermost section is formed from corrugated. Of course, the other sections may be formed in a like manner, if desired. The lower and the intermediate sections 62 are connected to the supporting casing 16 via respective integral bridge pieces 63. In this arrangement there are formed, in all, three heat exchange medium spaces 64 between the supporting plate 16 and the evaporation surface 10.

Figure 3A:
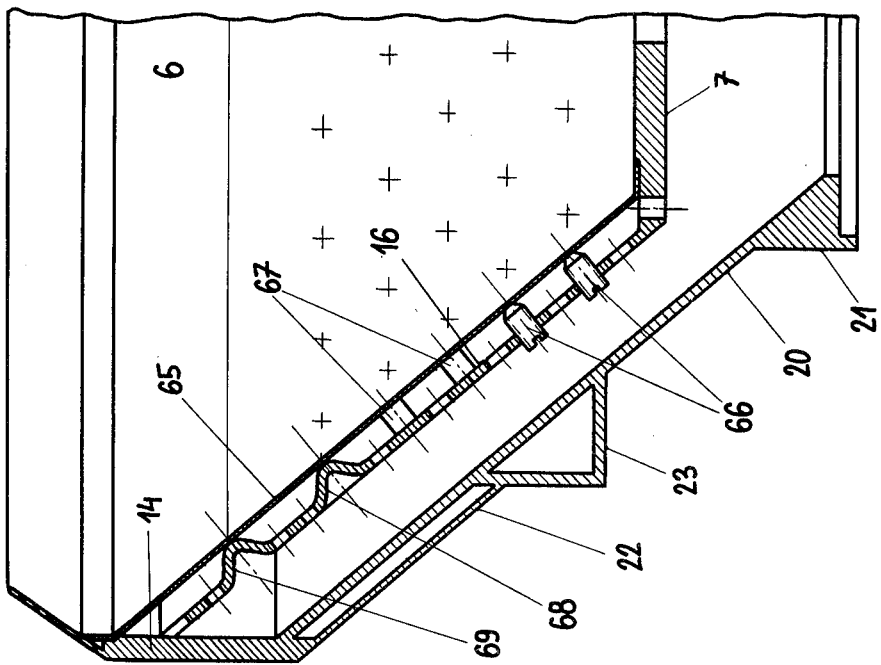

The embodiment shown at FIG. 3A is somewhat different from those previously described and illustrated. The supporting plate 16 is formed as a perforated sheet-metal plate but the spacers, in this case, comprise two bolts 66 which are located in correspondingly screw-threaded holes in the supporting casing 16. The element having the evaporation surface is connected to the bolts 66 by spot welding or the like in any other convenient manner. As an alternative to the bolts 66, cylindrical spacers 67 fixed by welding to the rear face of the element defining the evaporation surface 65 and also to the supporting casing 16 may be utilised. Finally, the supporting plate may be so shaped as itself to form the spacers, as, for example, by providing corrugated or humped formations 68,69 by which the element presenting the evaporation surface 65 and the supporting plate are secured together.

In the embodiment according to FIG. 4 the element defining the evaporation surface 10 is formed similarly to that of the embodiment shown in FIG. 2, but the supporting construction is simplified from the manufacturing point of view. Generally horizontally arranged supporting rings 48 or bridge-piece sheet-metal plates are welded onto the supporting casing 16 such that they lie with their inner peripheral regions directly beneath the steps 54 of the evaporation plate 10. Screw bolts 66 (see also FIG. 3) extend through the supporting rings in the inner peripheral regions thereof to engage the underside of a respective step 54 and serve for the bridging over of the gap 70 between the steps 54 and the supporting rings and thus provides a tolerance compensation. After mounting and adjusting thereof, the evaporation surface 10 is fixed to the screw bolts 66 by spot welding.

The construction and arrangement of the spacers is effected in all embodiments such that the stresses occurring are transmitted as uniformly as possible to the supporting casing 16. By so doing, the specific heat load can be increased considerably as compared with conventional thin layer evaporators, just as it is also possible to operate the thin layer evaporator at higher heating pressures and, on the vapour side, not only under vacuum but also under excess pressure.

Figure 6:
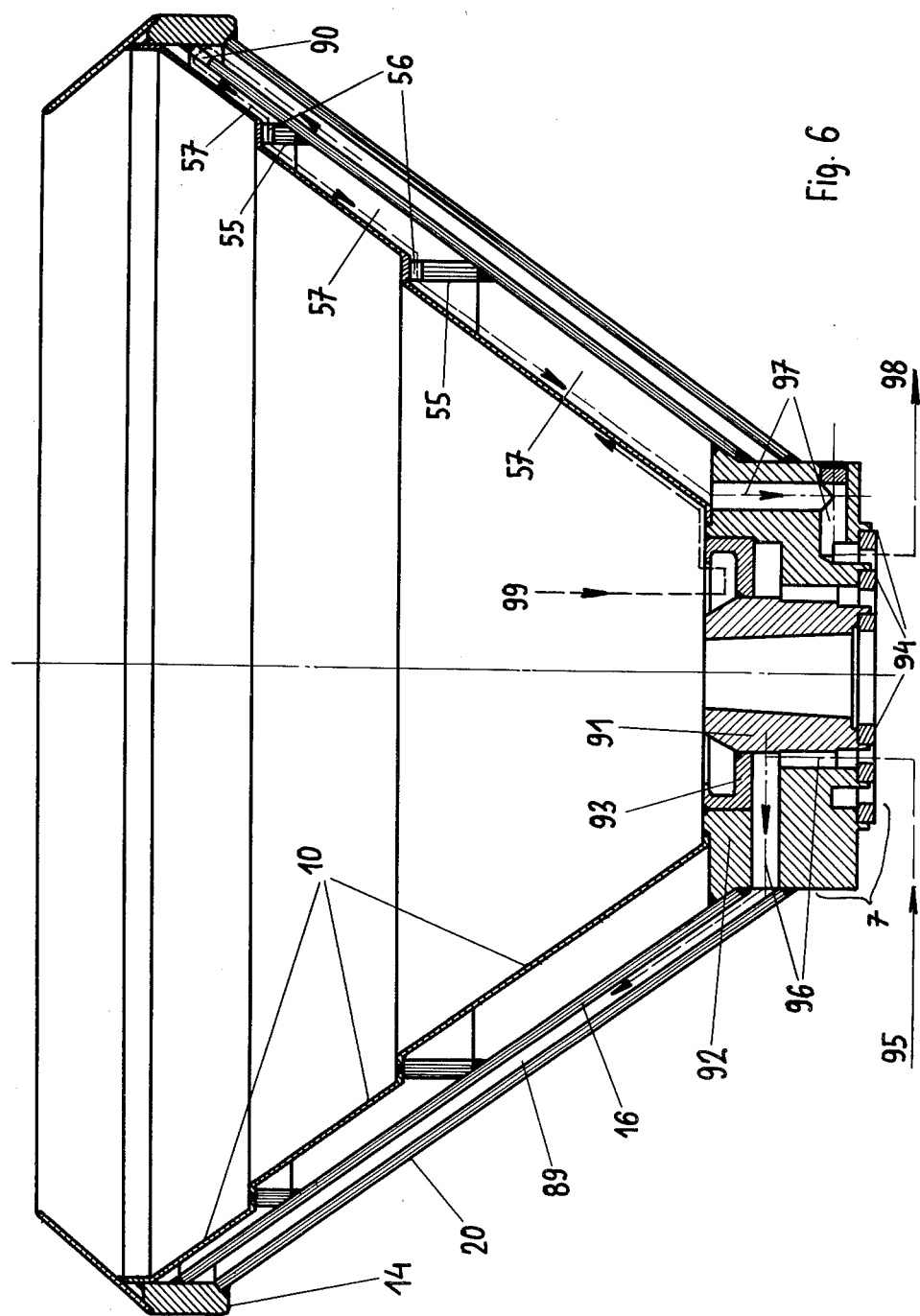
FIG. 6 is a view similar to FIG. 2 and shows the rotor for a liquid heat carrier.

In FIG. 6 an embodiment for heating using a liquid heat exchange medium is shown. The element defining the evaporation surface 10, the supporting casing 16 and the outer casing 20 are all welded to ring 14 at their larger peripheries, whilst at their smaller peripheries they are fixed to the collar 7 of the rotary drive, not shown. The collar 7 consists of a central bushing 91 and a distributor flange 92. The collar also carries the distributor plate 93 for the product under processing, the distributor plate being welded to the collar and the flow path of the product under processing being indicated by arrow 99. In its lower area the distributor flange has two concentric annular channels whereby, via the inner one, the heat exchange medium is supplied according to the direction of the arrow 95 and, via the outer one, the heat exchange medium is lead off according to the direction of the arrow 96. The annular channels are sealed in respect of one another and in respect of the surroundings by slide ring seals of which only the counter rings 94 are shown in the drawing. The heat exchange medium passes, via one or more radial channels 96, to the space 89 between the outer casing 20 and the supporting casing 16 and flows, via holes 90 in the upper area of the supporting casing 16, into the heat exchange medium spaces 57, finally leaving through one or more channels 97 in the distributor flange 92, which channels 97 extend parallel to the axis of the collar.

What I claim is:

1. A centrifugal rotor construction comprising an evaporation element providing an evaporation surface having a largest and a smallest periphery, an outer casing element spaced apart in facing relationship with respect to that surface of said evaporation element opposite said evaporation surface, the largest periphery of said evaporation surface and outer casing being joined to collectively form a heat-exchange medium chamber therebetween, and a rotationally symmetrical supporting casing permeable to a heat-exchange medium positioned between said evaporation surface and said outer casing, said evaporation element being supported by said supporting casing at at least one point lying between extremely oppositely disposed peripheries of said evaporation surface as well as the smallest periphery of said evaporation surface.

2. A centrifugal rotor construction as claimed in claim 1, wherein said rotor construction includes rotary drive means disposed axially and below the smallest periphery of said evaporation surface and wherein said supporting casing is located, with a flange at its smallest end directly or indirectly on the output shaft of said rotary drive means.

3. A centrifugal rotor construction for use in an evaporator comprising:
   evaporation means having an evaporation surface thereon,
   an outer casing means spaced apart from said evaporation means, said evaporation means and casing means being operatively associated to define collectively a heat-exchange medium chamber therebetween for supplying heat to said evaporation surface,
   and a supporting casing means disposed between said casing means and evaporation means, said supporting casing means being permeable to a heat-exchange medium and supporting said evaporation means at a plurality of spaced points thereon thereby permitting a reduction in the wall thickness of said evaporation means and preventing vibration of said evaporation means during rotation thereof,
   wherein said evaporation surface is a stepped conical surface which is connected in the stepped area to said supporting casing.

4. A centrifugal rotor construction according to claim 1, wherein the evaporation surface comprises a sheet metal plate having annular angular bends therein lying between the inner and outer peripheries of the plate and connected in the area of said bends to the supporting casing.

5. A centrifugal rotor construction as claimed in claim 1, wherein the evaporation surface comprises several concentric sections assembled together to form a stepped cone connected to the supporting casing in the area of the transition points of the steps.

6. A centrifugal rotor construction for use in an evaporator comprising:
    evaporation means having an evaporation surface thereon,
    an outer casing means spaced apart from said evaporation means, said evaporation means and casing means being operatively associated to define collectively a heat-exchange medium chamber therebetween for supplying heat to said evaporation surface,
    and supporting casing means disposed between said casing means and evaporation means, said supporting casing means being permeable to a heat-exchange medium and supporting said evaporation means at a plurality of spaced points thereon thereby permitting a reduction in the wall thickness of said evaporation means and preventing vibration of said evaporation means during rotation thereof,
    wherein the supporting casing comprises a perforated sheet-metal plate of greater thickness than that of the evaporation surface.

7. A centrifugal rotor construction as claimed in claim 1, wherein the supporting casing is substantially conically shaped.

8. A centrifugal rotor construction as claimed in claim 11, wherein the evaporation surface is fixed to the supporting casing by means of spacers.

9. A centrifugal rotor construction as claimed in claim 8, wherein said spacers are inserted between the evaporation surface and the supporting casing.

10. A centrifugal rotor construction as claimed in claim 9, wherein the supporting casing is comprised of sheet metal having at least one corrugation therein and the evaporation surface is fixed to each of said at least one corrugations.

11. A centrifugal rotor construction as claimed in claim 9, wherein said spacers comprise bolts which screw-threadedly engage said supporting casing.

12. A centrifugal rotor construction as claimed in claim 9, wherein said spacers consist of at least partially annular sheet-metal plates and bolts are engaged with the inner surface area thereof, the evaporation surface being fixed by said bolts.

13. A centrifugal rotor construction as claimed in claim 8, wherein the spacers are annularly shaped and extend around the outer surface of the evaporating surface, and two adjacent spacers in combination with the evaporating surface and the supporting casing form condensation chambers.

14. A centrifugal rotor construction as claimed in claim 13, wherein said condensation chambers are communicatingly connected by openings in the spacers.

15. A centrifugal rotor construction for use in an evaporator comprising:
    evaporation means having an evaporation surface thereon,
    an outer casing means spaced apart from said evaporation means, said evaporation means and casing means being operatively associated to define collectively a heat-exchange medium chamber therebetween for supplying heat to said evaporation surface,
    and a supporting casing means disposed between said casing means and evaporation means, said supporting casing means being permeable to a heat-exchange medium and supporting said evaporation means at a plurality of spaced points thereon thereby permitting a reduction in the wall thickness of said evaporation means and preventing vibration of said evaporation means during rotation thereof,
    wherein the evaporation surface has on its greatest periphery an inwardly drawn edge.

16. A centrifugal rotor construction as claimed in claim 1, wherein the outer casing further includes reinforcements disposed exteriorly thereof forming insulation chambers.

17. A centrifugal rotor construction as claimed in claim 16, wherein said reinforcements comprise hollow rings.

18. A centrifugal rotor construction as claimed in claim 1, wherein the evaporation surface, the supporting casing and the outer casing are of a self-supporting welded construction.

19. In a thin film evaporator comprising a housing enclosing a vapor chamber, means for feeding a crude product thereinto, means for withdrawing concentrate, means for supplying a heating medium, means for removing condensate, a rotor and associated drive means therefor being disposed generally centrally of said housing, wherein the improvement comprises a centrifugal rotor comprising evaporation means having an evaporation surface thereon, an outer casing means spaced apart from said evaporation means, said evaporation means and casing means being operatively associated to define collectively a heat-exchange medium chamber therebetween for supplying heat to said evaporation surface, and a supporting casing means disposed between said casing means and evaporating means, said supporting casing means being permeable to a heat exchange medium and supporting said evaporation means at a plurality of spaced points thereon thereby permitting a reduction in the wall thickness of said evaporation means and preventing vibration of said evaporation means during rotation thereof, wherein said rotor is disposed above said drive means and said drive means includes an output shaft, the center axis of said rotor being in axial alignment with said output shaft, and said rotor being supported on said output shaft for rotation about the vertical axis of said rotor and drive means by means of a sealing ring and wherein the crude product is fed through the vapor chamber to said evaporation surface and said thin film evaporator further includes a preheater disposed in the lower part of said housing flowed through by the crude product and a heat exchanger for the condensation of distillate.

20. The thin film evaporator as claimed in claim 19, wherein an annular space is provided between said drive means and said sealing ring, said annular space extending between said outer casing and the outer surface of said supporting casing for flowthrough by said heat exchange medium, said annular space further permitting the passage of a condensate draw-off pipe therethrough.

21. The thin film evaporator as claimed in claim 19, wherein said sealing ring seals the outer casing in relation to the lower part of said housing and said sealing ring comprises a bearing bushing on one part and a sliding bearing arranged concentrically therewith on the other part and on the inner side of which are disposed slide rings double acting in the radial direction.

22. The thin film evaporator as claimed in claim 21, wherein the slide rings are in sealing relationship with a counter ring and are arranged for axial displacement.

23. The thin film evaporator as claimed in claim 21, wherein two slide rings are supported in an annular recess of a stationary bearing head by means of compression springs and wherein a bearing ring concentrically surrounds the slide rings as part of the bearing head.

24. In a thin film evaporator for a liquid heat exchange medium, comprising a housing enclosing a vapor chamber, means for feeding a crude product thereinto, means for withdrawing concentrate, means for supplying a heating medium, means for removing condensate, a rotor and associated drive means therefor being disposed generally centrally of said housing, wherein the improvement comprises a centrifugal rotor comprising evaporation means having an evaporation surface thereon, an outer casing means spaced apart from said evaporation means, said evaporation means and casing means being operatively associated to define collectively a heat exchanger medium chamber therebetween for supplying heat to said evaporation surface, and a supporting casing means disposed between said casing means and evaporating means, said supporting casing means being permeable to a heat exchange medium and supporting said evaporation means at a plurality of spaced points thereon thereby permitting a reduction in the wall thickness of said evaporation means and preventing vibration of said evaporation means during rotation thereof, wherein the evaporation surface, supporting casing and the outer casing are fixed at their respective smallest diameters and in axial alignment along the center axis thereof on a hub of the rotary drive means and the hub has two concentric annular channels through which the heat exchange medium is fed and taken off respectively and which annular channels are sealed in relation to each other, the rotary drive means and the vapor chamber by sealing rings.

25. The thin film evaporator as claimed in claim 24, wherein the supporting casing has near the largest periphery thereof holes for the passage of the heat exchange medium from the chamber between the outer casing and the supporting casing in the heat exchange spaces between said chamber and the evaporation surface.

* * * * *